United States Patent
Singer et al.

(10) Patent No.: US 10,545,060 B2
(45) Date of Patent: Jan. 28, 2020

(54) SENSOR SYSTEM AND METHOD FOR MONITORING A POWERTRAIN

(71) Applicant: Fugro Technology B.V., Leidschendam (NL)

(72) Inventors: Johannes Maria Singer, Leidschendam (NL); Devrez Mehmet Karabacak, Leidschendam (NL); Bill Heffernan, Dublin (IE)

(73) Assignee: Fugro Technology B.V. (NL)

( * ) Notice: Subject to any disclaimer, the term of this patent is extended or adjusted under 35 U.S.C. 154(b) by 0 days.

(21) Appl. No.: 15/572,606

(22) PCT Filed: May 8, 2015

(86) PCT No.: PCT/NL2015/050319
§ 371 (c)(1),
(2) Date: Nov. 8, 2017

(87) PCT Pub. No.: WO2016/182430
PCT Pub. Date: Nov. 17, 2016

(65) Prior Publication Data
US 2018/0136058 A1    May 17, 2018

(51) Int. Cl.
*G01L 1/24* (2006.01)
*G01M 11/08* (2006.01)
(Continued)

(52) U.S. Cl.
CPC .............. *G01L 1/246* (2013.01); *G01B 11/18* (2013.01); *G01D 5/35316* (2013.01); *G01L 3/12* (2013.01);
(Continued)

(58) Field of Classification Search
CPC . G01L 1/246; G01L 11/02; G01L 3/12; G01L 3/14; G01L 5/12; G01L 5/133;
(Continued)

(56) References Cited

U.S. PATENT DOCUMENTS 5,274,226 A     12/1993  Kidwell et al.
6,314,214 B1 *  11/2001  Walter .................... G01B 11/18
                                                              385/12

(Continued)

FOREIGN PATENT DOCUMENTS

CN    102478442 A    5/2012
CN    102997860 A    3/2013
(Continued)

OTHER PUBLICATIONS

International Search Report and Written Opinion; PCT Application No. PCT/NL2015/050319; dated Apr. 11, 2016.
(Continued)

*Primary Examiner* — Octavia Hollington
(74) *Attorney, Agent, or Firm* — Polsinelli PC

(57) ABSTRACT

A sensor system (10) and method for monitoring a powertrain (20) having a drive shaft (1). The sensor system (10) comprises an optical fibre (2) with a strain sensitive element (3). According to one aspect, a connection structure (4) is configured to hold at least a part of the optical fibre (2) with the strain sensitive element (3) at a radial distance (R2-R1) remote from the drive shaft (1) for amplifying the strain (S2) on the strain sensitive element (3) with respect to the strain (S1) on the drive shaft (1). According to a further aspect, at least three respective lengths of one or more optical fibres follow parallel, e.g. helical, paths with respect to each other to distinguish different strain forces.

25 Claims, 7 Drawing Sheets

(51) Int. Cl.
- *G01B 11/16* (2006.01)
- *G01L 3/12* (2006.01)
- *G01L 3/14* (2006.01)
- *G01L 5/13* (2006.01)
- *G01D 5/353* (2006.01)

(52) U.S. Cl.
CPC ............... *G01L 3/14* (2013.01); *G01L 5/133* (2013.01); *G01L 5/166* (2013.01); *G01M 11/085* (2013.01)

(58) Field of Classification Search
CPC ....... G01L 5/166; G01L 9/0011; G01D 5/268; G01D 5/35316; G01B 11/18; G01M 5/0025; G01M 5/0091; G01M 11/085
USPC .......................................................... 73/800
See application file for complete search history.

(56) References Cited

U.S. PATENT DOCUMENTS

| | | | | |
|---|---|---|---|---|
| 6,647,800 | B2 * | 11/2003 | De La Puente | G01B 11/165 73/800 |
| 6,718,078 | B2 * | 4/2004 | Gauthier | G01L 3/12 250/227.16 |
| 7,398,697 | B2 * | 7/2008 | Allen | E21B 17/01 73/800 |
| 7,792,400 | B1 * | 9/2010 | Zhang | G02B 6/3604 385/25 |
| 7,881,567 | B2 * | 2/2011 | Bosselmann | G01B 11/165 385/12 |
| 2004/0129868 | A1 | 7/2004 | Kilmartin | |
| 2005/0253051 | A1 | 11/2005 | Hwang et al. | |
| 2006/0115335 | A1 | 6/2006 | Allen et al. | |
| 2008/0158562 | A1 | 7/2008 | Becker | |
| 2010/0014072 | A1 | 1/2010 | Bosselmann et al. | |

FOREIGN PATENT DOCUMENTS

| | | |
|---|---|---|
| DE | 102008014644 A1 | 10/2009 |
| EP | 1887316 A1 | 2/2008 |
| JP | H0687835 U | 12/1994 |
| JP | 2002107122 A | 4/2002 |
| JP | 2003123178 A | 4/2003 |
| WO | 2006050488 A1 | 5/2006 |
| WO | 2008028813 A2 | 3/2008 |

OTHER PUBLICATIONS

English abstract of JP2003123178; retrieved from www.espacenet.com on Nov. 7, 2017.

English abstract of CN102478442; retrieved from www.espacenet.com on Nov. 7, 2017.

English description of JPH0687835; retrieved from www.espacenet.com on Nov. 7, 2017.

English abstract of DE102008014644; retrieved from www.espacenet.com on Nov. 7, 2017.

English abstract of EP1887316; retrieved from www.espacenet.com on Nov. 7, 2017.

Search Report and Written Opinion; Singapore Application No. 11201709200Y; dated Jul. 24, 2018.

English translation of Chinese Application No. 102997860; retrieved from wvvw.espacenet.com on Jul. 31, 2018.

English translation of Japanese Application No. 2002107122; retrieved from www.espacenet.com on Jul. 23, 2018.

* cited by examiner

SENSOR SYSTEM AND METHOD FOR MONITORING A POWERTRAIN

CROSS-REFERENCE TO RELATED APPLICATIONS

This application is a national stage application of International Application No. PCT/NL2015/050319, which was filed on May 8, 2015, of which is incorporated by reference in its entirety.

TECHNICAL FIELD AND BACKGROUND

The present disclosure relates to a sensor system and method for monitoring a powertrain, in particular a powertrain comprising a drive shaft.

A powertrain or propulsion system is typically used to transfer mechanical energy into movement, for example movement of a vehicle, aircraft, or ship. A powertrain is formed by the main components that generate power and deliver it e.g. to the road surface, water, or air. This may include e.g. an engine, drive shaft, and final drive. A drive shaft or propulsion shaft is a mechanical component for transmitting torque and rotation between components of a powertrain, e.g. between the engine and final drive, or components there between. The final drive may e.g. include wheels, propellers, etcetera that interact with the environment to cause movement.

When a drive shaft is subjected to mechanical forces such as torque and thrust, these can result in small longitudinal and/or torsional strains (or angular displacement) at the surface of the shaft. These strains or deformations can be a measure for efficiency of the propulsion system. However, effectively detecting torsional torque and longitudinal strain of a rotating shaft member can be difficult to implement. This is a particular problem in the shipping industry where such measuring and monitoring systems typically operate in a harsh or hostile environment. Moreover for ship owners ensuring the propulsion shaft is operating correctly can be important to ensure optimum operating of the ship's engine thus minimizing fuel consumption and maintenance costs.

For example, German patent publication number DE 10 2008 014 644, describes a system with a fibre optic cable having fibre Bragg sensors for measuring properties of a drive shaft to operate a propeller. According to the prior art, the sensors are preferably mounted in or on a (hollow) drive shaft to reduce space outside of the shaft. However, it can be difficult to measure small deformations of the drive shaft. According to the prior art, an optic fibre is wrapped around a shaft in such way that it defines three sections: a first section longitudinal to the shaft, a second section wherein two parts of the fibre are orthogonal to one another and a twist wherein a section is radial to the shaft. However, the known system may be complex to install and prone to installation errors that would lead to erroneous measurements. Furthermore, the known system may have difficulty distinguishing different types of deformation, e.g. separating torsion, bend, and axial deformations.

Accordingly, it is desired to provide an improved sensor system and method for monitoring a powertrain having a drive shaft wherein one or more problems associated with the prior art are alleviated while maintaining at least some of the advantages.

SUMMARY

A first aspect of the present disclosure provides a sensor system for monitoring a powertrain having a drive shaft. The sensor system comprises an optical fibre comprising a strain sensitive element configured to change at least one of its optical properties as a function of strain on the sensor. The sensor system further comprises a connection structure configured to connect the optical fibre to the drive shaft wherein a strain on the drive shaft is passed by the connection structure to cause a strain on the strain sensitive element. The sensor system further comprises or couples to a light source connected to the optical fibre and configured to emit an input light signal to the optical fibre for optical interaction with the strain sensitive element. The sensor system further comprises or couples to a light detector configured to receive an output light signal from the optical fibre resulting from the optical interaction of the input light signal with the strain sensitive element for measuring the strain on the strain sensitive element. The connection structure is configured to hold at least a part of the optical fibre with the strain sensitive element at a radial distance remote from the drive shaft.

Advantageously, the connection structure may cause strain and resulting deformation on the strain sensitive element to be amplified with respect to that on the drive shaft. Accordingly, strain induced deformation of the strain sensitive element at a distance remote from the shaft can be larger than the strain induced deformation e.g. directly at a surface of the shaft. For example, a torque force on the drive shaft may cause a small twisting deformation of the structure of the drive shaft. The twisting deformation e.g. at an outer surface of the drive shaft can be amplified by a rigid connection between the shaft and the strain sensitive element or sensor held at a radial distance from the drive shaft. Also other deformations, e.g. bending of the shaft may be amplified via the connection structure. By using a connection structure that is optionally separable from the drive shaft, it can also be more convenient to install and/or replace the sensors on the drive shaft.

Amplification of the strain or deformation can be influenced e.g. by a radius at which the connection structure is configured to hold the sensor element with respect to the shaft. For example by holding the sensor element at a radius that is at least a factor 1.1 times an average or maximum radius of the outer surface of the shaft, a significant increase in strain induced deformation may already be obtained. Preferably, the radius at which the strain sensitive element is held is even larger, e.g. one-and-a-half, twice, or even three times the radius of the outer surface of the shaft. The larger the radial distance, the more amplified may be the deformation of the shaft.

Deformation in the shaft can e.g. be passed to a remotely held sensor element via a rigid structure. For example a cylinder can be clamped or otherwise connected around an outer surface of the shaft to pass the motions of the shaft to the sensor element. Alternatively, or in addition, by using a connection formed by rigid rings along a length of the shaft, a bending or twisting motion can be followed by the rings at two or more positions along the shaft. For example, a cylinder can be formed of two or more rigid rings with a more flexible structure there between. The sensor elements may be attached e.g. to an outer surface of the connection structure. Alternatively, or in addition, the connection structure may also comprise a shielding to protect the optical fibres and/or strain sensitive elements. The shielding can be provided by an additional outer structure around the connection structure and/or the elements can be partially or fully embedded in the connection structure. Accordingly, the connection structure may be used to shield the sensors from environmental conditions.

The strain sensitive element may e.g. comprise an optical strain sensor such as a Fibre Bragg Grating (FBG) or other element that changes one or more of its optical properties as a function of strain on the element. For example, strain sensitive element may be integrated in the optical fibre and have a reflection and/or transmission spectrum that changes as a function of strain on the fibre or element. Also other optical sensor properties and sensitivities may be used. For example, the optical properties of the sensor can be read out by injecting light in the optical fibre and measuring the reflection and/or transmission thereof. For example, a light source such as a laser diode can be used to interrogate the optical sensor. Light interaction with the strain sensor can be measured e.g. by a suitable light detector. The light source may e.g. emit a broadband light spectrum and the detector may measure the spectral response of the strain sensitive portion. The light source may also emit a narrow band light spectrum that is swept across different interrogation wavelengths of the sensor.

The light source and detector can be integrated e.g. in an interrogator module connected to the optical fibre. By integrating the interrogator module in the connection structure, or otherwise attaching the light source and/or light detector to the drive shaft, it can be avoided that optical signals are transferred between the rotating strain sensitive elements and the fixed world. Power and other signals can be provided e.g. via an electrical slip ring. Alternatively, by integrating a power source in the connection structure, the slip rings can be avoided and the system can be fully self-contained. For example, sensor signals can be transmitted wirelessly to a control room. Alternative to an integrated interrogator module, optical signals can also be transferred to the rotating structure, e.g. via a fibre optic rotary joint. In this way the interrogator module can be kept in a separate location and is not affected by the harsh environments that can potentially surround the shaft, e.g. high temperature, vibration, motion etc. By using an off-axis fibre optic rotary joint, e.g. slip ring, the optical fibre can be passed between the rotating and stationary frame without needing to go to a central axis of the drive shaft.

By pre-stressing the optical fibre comprising the strain sensitive element while connecting, the said sensor element may change its optical properties in both directions, i.e. both for further elongation of the optical fibre and also for shortening of the fibre. In this way, changes in the length of the fibre caused by strain on the drive shaft can be measured both in the shortening and elongating of the shaft.

A second aspect of the present disclosure provides a sensor system for monitoring a powertrain having a drive shaft. The sensor system comprises one or more optical fibres comprising at least three strain sensitive elements arranged along at least three respective lengths of the one or more optical fibres wherein each strain sensitive element is configured to change at least one of its optical properties as a function of strain on the respective length of the optical fibre comprising the strain sensitive element. The respective lengths of the one or more optical fibres are connected to the drive shaft wherein the connection is configured to pass a strain on the drive shaft to cause as a respective strain on the strain sensitive elements. One or more light sources are connected to the one or more optical fibres and configured to emit input light signals to the one or more optical fibres for optical interaction with the strain sensitive elements. One or more light detectors are configured to receive output light signals from the one or more optical fibres resulting from the optical interaction of the input light signals with the strain sensitive elements for measuring the respective strain on the strain sensitive elements. The respective lengths of the one or more optical fibres follow parallel paths with respect to each other wherein the parallel paths extend at least in a direction along a length of the drive shaft.

By using at least three strain sensitive elements arranged along parallel paths of one or more an optical fibres, the system may be used to distinguish different types of deformation, e.g. induced by torque or bending, respectively. For example, torque induced deformation of the shaft may result in the same sensor signal (e.g. wavelength shift) for all parallel fibres, e.g. by the same compression or stretching across all sensors. For example, bending induced deformation of the shaft may result in sensor signals that have different signs, e.g. while sensors on one side of the shaft are compressed, sensors on the other side are stretched. The parallel fibre sections can be attached directly to the drive shaft or the parallel fibre sections are used in combination with the connection structure as described herein, to provide synergetic advantage with regards to distinguishing different types of deformation with great sensitivity and the portability and install of the sensor system.

Preferably, the respective lengths of the one or more optical fibres follow parallel paths which may provide a rotational symmetry to the sensor system. It is noted that if the fibres follow parallel paths with respect to each other, the paths are not necessarily parallel to a length of the shaft. Accordingly, the term parallel as used herein may refer a path, wherein the lengths of the fibres are equidistant with respect to each other in a surface along a circumference around the drive shaft. For example, the fibres can be attached directly or via a connection structure to run parallel to a length of the shaft. Alternatively, the respective lengths of the optical fibres follow parallel helical paths extending both along the length of the shaft and around the circumference of the shaft. By following a helical path, the fibres may have a greater sensitivity to a torque induced (twisting) deformation compared e.g. to a thrust induced (elongation/shortening) of the shaft. Also combinations are possible, e.g. to distinguish thrust from torque. Alternatively, or in addition, a helical path may increase the range in which the fiber can withstand bending without breaking. Alternatively, or in addition, when two lengths of fibre are uses with reverse helical paths, this may facilitate distinguishing torque (twist) from thrust (length change).

In addition to the fibres, being equidistant with respect to each other, the respective lengths of the one or more optical fibres are preferably also equidistantly distributed along a circumference around the drive shaft. For example, three fibre sections can be equidistantly arranged around the drive shaft or connection structure at 120 degree angle intervals with respect to each other. By using an equidistant distribution of fibres the system may have improved symmetry which can allow a more uniform and predictable behaviour independent on the direction of e.g. a bending deformation.

The strain sensitive elements can be comprised in the respective lengths of a single optical fibre or a plurality of fibres can be used. One respective length along a parallel path may also comprise multiple strain sensitive elements, e.g. to improve reliability and/or measure at different axial locations of the shaft. Reflected signals of multiple strain sensitive elements can also be combined, e.g. by constructive interference to enhance the signal amplitude. In one example, FBGs are placed in locations of stretching and serve as the strain sensing elements. Here, the FBG reflection wavelengths will be different, to make sure they are individually monitored. As such, the reflections will not be interfered but e.g. interpreted together to gain more detailed mapping of the shaft and/or increase accuracy. In this case for example, two or even more FBGs can be used on one fiber. In another example, the FBGs are used as partial reflectors with overlapping reflection wavelengths and Fabry-Perot interferometry is performed whereby the constructive or destructive interference from the two reflections on measured section forms an amplitude signal indicative of the length change between the two reflectors.

By using an optional temperature sensor, the system may compensate for temperature offset and/or drift, e.g. temperature induced changes of the optical properties of the strain sensitive elements. Advantageously, an optical temperature sensor can be arranged along a length of the one or more optical fibres. For example, the optical temperature sensor may comprise another FBG. By tightly wrapping the fibre with optical temperature sensor around the structure of the drive shaft or connection structure (e.g. along a looped or helical path), a temperature change may cause expansion or contraction of the structure leading to a wavelength shift of the optical temperature sensor. Advantageously, the wavelength shift caused by the expansion or contraction of the shaft/connection structure may be the same direction as the wavelength shift caused by the direct effect of the temperature on the sensor. For example, the sensitivity of the optical temperature sensor can be enhanced by a factor of two, or more.

A third aspect of the present disclosure provides a method for monitoring a powertrain having a drive shaft. The method comprises providing the sensor system according to any of the preceding claims, wherein one or more optical fibres of the sensor system are connected to the drive shaft. The method comprises emitting an input light signal to one or more optical fibres for optical interaction with one or more strain sensitive elements. The method comprises measuring an output light signal from the optical fibre resulting from the optical interaction of the input light signal with the one or more strain sensitive elements for measuring the respective strain on the one or more strain sensitive elements. The method comprises based on the measured respective strain, calculating one or more of a torque on the drive shaft, bending strain of the drive shaft, or thrust strain on the drive shaft.

The method may e.g. be used in combination with the system features according to the first and/or second aspects. For example, the method may be used for adjusting operation of an engine driving the powertrain based on the calculated torque, bending, and/or thrust. The method may also comprise distinguishing between a torque induced deformation of the drive shaft and a bending deformation of the drive shaft by comparing respective signs of wavelength shifts in the optical properties of the at least three strain sensitive elements.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
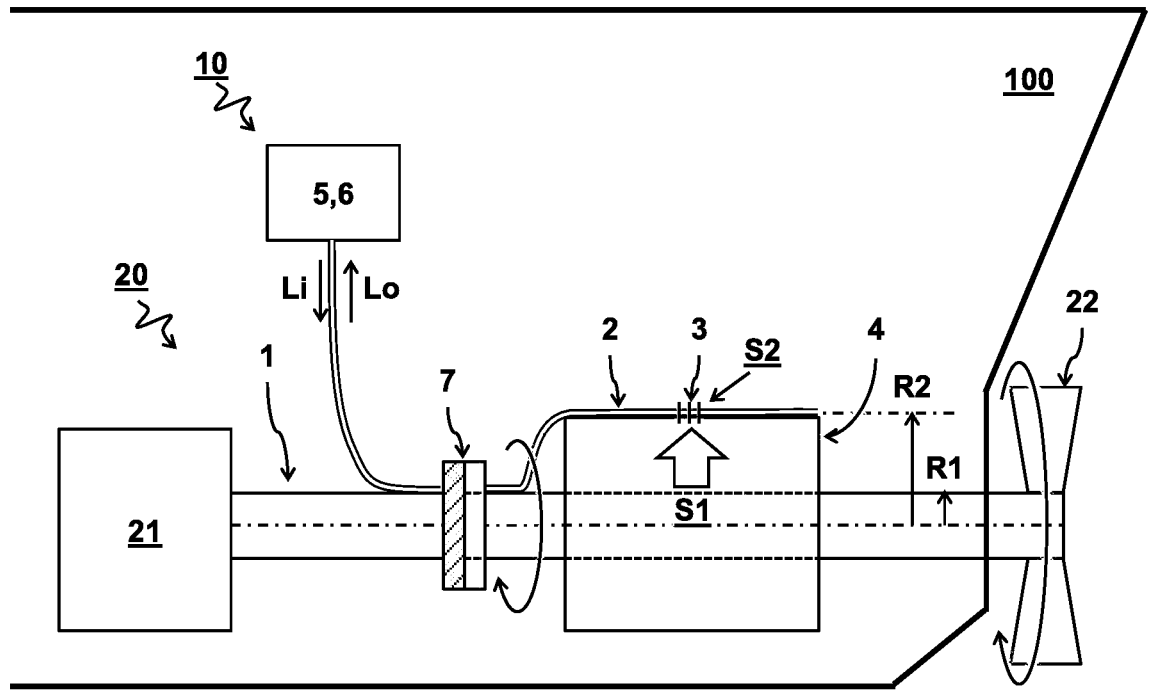
FIG. 1A schematically illustrates a first embodiment of a sensor system wherein optical signals are coupled between an interrogator and strain sensor by an off axis fibre optic rotary joint.

Unless otherwise defined, all terms (including technical and scientific terms) used herein have the same meaning as commonly understood by one of ordinary skill in the art as read in the context of the description and drawings. In some instances, detailed descriptions of well-known devices and methods may be omitted so as not to obscure the description of the present systems and methods. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be understood that when a connection between structures or components is described, this connection may be established directly or through intermediate structures or components unless specified otherwise. In the drawings, the absolute and relative sizes of systems and components may be exaggerated for clarity. Embodiments may be described with reference to schematic and/or cross-section illustrations of possibly idealized embodiments and intermediate structures of the invention. In the description and drawings, like numbers refer to like elements throughout.

FIG. 1A schematically illustrates a first embodiment of a sensor system 10 for monitoring a powertrain 20 having a drive shaft 1.

Figure 1B:
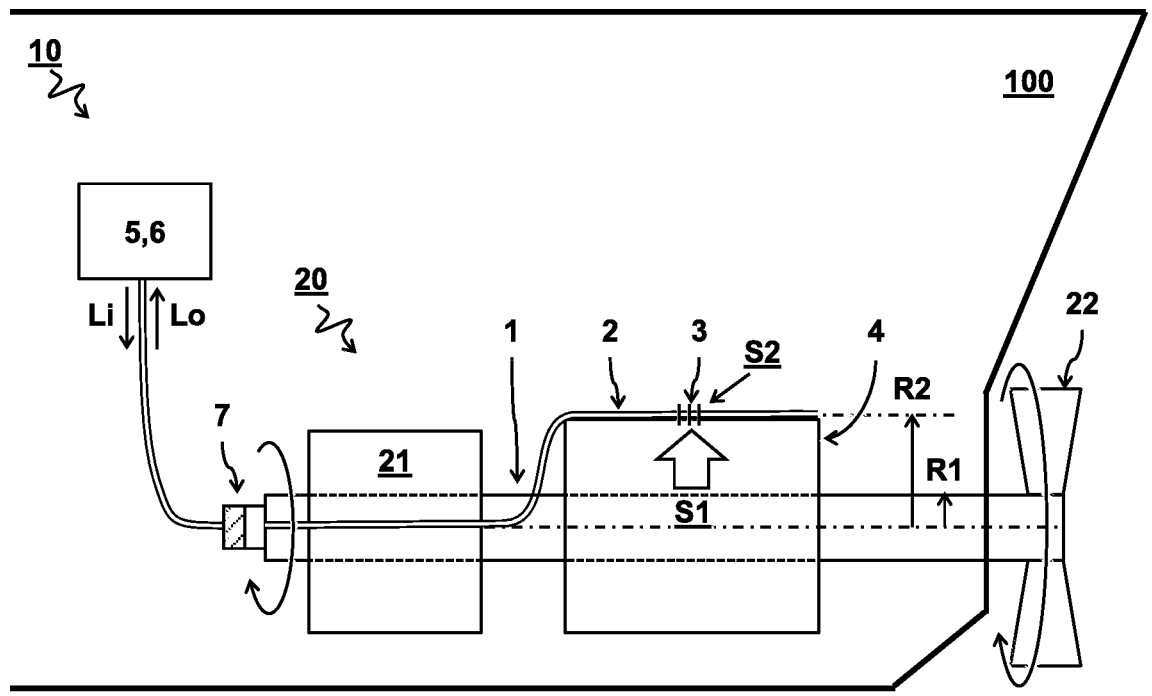
FIG. 1B schematically illustrates a second embodiment of a sensor system wherein optical signals are coupled between an interrogator and strain sensor by an on-axis fibre optic rotary joint.

FIG. 1B schematically illustrates a second embodiment of a sensor system 10 for monitoring a powertrain 20 having a drive shaft 1.

In one embodiment, the sensor system 10 comprises an optical fibre 2 comprising a strain sensitive element 3 configured to change its optical properties as a function of strain S2 on the sensor. For example, the strain sensitive element or optical strain sensor may comprise an FBG, fibre laser, multicore fibre, and/or birefringent FBG. In one embodiment, at least a part of the optical fibre 2 comprising the strain sensitive element 3 is pre-stressed in absence of strain on the drive shaft 1. In one embodiment, a light source 5 is connected to the optical fibre 2 and configured to emit an input light signal Li to the optical fibre 2 for optical interaction with the strain sensitive element 3. In one embodiment, a light detector 6 is configured to receive an output light signal Lo from the optical fibre 2 resulting from the optical interaction of the input light signal Li with the strain sensitive element 3 for measuring the strain S2 on the strain sensitive element 3.

In one embodiment, the light source 5 and light detector 6 are comprised in an interrogator module. The light source 5 and light detector 6 may also be separate, e.g. at either ends of the optical fibre 2. In one embodiment, the light source 5 comprises a laser diode. Of course also other light sources are possible. In one embodiment, the light source 5 is configured to emit an interrogation wavelength that is at least partially reflected by the strain sensitive element 3. In one embodiment, the strain sensitive element 3 is configured to reflect and/or transmit a variable wavelength as a function of a strain on the strain sensitive element values. For example, the strain sensitive element comprises a Fibre Bragg Grating (FBG).

In one embodiment, the light source 5 is configured to sweep the wavelength of the input light Li over a range of interrogation wavelengths. Alternatively, or in addition, the light source 5 is configured to emit broadband light covering a range of interrogation wavelengths. Preferably, the light detector 6 is configured to detect the output light signal Lo reflected by the strain sensitive element 3 at the same end of the optical fibre 2 as where the light source 5 injects the input light signal Li. Alternatively, the light detector 6 is configured to detect the output light signal Lo transmitted by the strain sensitive element 3 at the other end of the optical fibre 2 as where the light source 5 injects the input light signal Li. Different interrogation methods are known from the prior art. For example, WO2014023770 discloses a system and method for dynamically sweeping a tuneable laser.

In one embodiment, one or more fibres 2 are interrogated, by in interrogator module 5,6. For example, the interrogator 5,6 emits interrogating light Li by means of a laser source 5 at different wavelengths and/or polarization states through an optical fibre, 2, such optical fibre 2 further comprising a strain sensitive element 3 such as an FBG. Such FBG may work as a mirror for some of such wavelengths. The spectral properties of the wavelengths that are reflected back (their amplitude, for example), or light reflected Lo, are dependent at least on the strain on the FBG.

One embodiment of a strain measuring device is an optically interrogated FBG written into an optical fibre. An optical interrogator system can be employed and used for the process of monitoring of the optical fibre having one or more strain sensitive elements. Strain sensitive elements are usually subject to uniform fields of certain types of perturbation such as strain or temperature. In one use, the spectrum of the light reflected by a sensor has its peak monitored, indicating the magnitude of the perturbation. The longitudinal and radial displacements incurred by the propulsion shaft 1 in use can be easily and accurately measured by the interrogator system interrogating the at least one optical fibre. In one example, the peak reflection wavelength value is monitored instead of, or in addition to, the peak amplitude.

By recording strains dynamically, high frequency conditions of the shaft such as vibrations can be extracted. In one embodiment, the system comprises or writes to a memory (not shown) for recording the measured strain on the strain sensitive elements as a function of time. For example, strain is recorded at a short time intervals to capture vibrational motion of the shaft. In another or further embodiment, the system comprises or interacts with a processor (not shown). In a further embodiment, the processor is configured to calculate vibrational components in the drive shaft 1 based on time-dependent strain measurements of the strain sensors.

In one embodiment, the system comprises a connection structure 4 configured to connect the optical fibre 2 to the drive shaft 1 wherein a strain S1 on the drive shaft 1 is passed by the connection structure 4 to cause a strain S2 on the strain sensitive element 3. For example, strain can be passed by a rigid connection or structure between the drive shaft 1 and the strain sensitive element 3. In one embodiment, the connection structure 4 is configured to hold at least a part of the optical fibre 2 with the strain sensitive element 3 at a radial distance (in this case R2-R1) remote from the drive shaft 1 for amplifying the strain S2 on the strain sensitive element 3 with respect to the strain S1 on the drive shaft 1. In one embodiment, the drive shaft has a shaft radius R1 and the strain sensitive element 3 is held by the connection structure 4 at a distant radius R2 from a centre of the drive shaft 1. For example the distant radius R2 is at least a factor 1.1, one-and-a-half, two, or even three times the shaft radius R1. In one embodiment, the connection structure 4 is configured to be clamped, screwed, soldered or fixedly joint in any way known from prior art to an outer surface of the drive shaft 1.

In one embodiment, the drive shaft 1 is cylindrical. However, also other shapes are possible, e.g. square, hexagonal, or other polygonal cross-section. The shaft radius R1 can be defined e.g. as the average or maximum distance of an outer surface of the shaft with respect to a centre line of the shaft. In the embodiment shown, the connection structure 4 comprises a cylinder parallel to the shaft. However also other shapes are possible, e.g. as illustrated further below e.g. with reference to FIGS. 4A and 5A.

For example, optical slip rings or fibre optic rotary joints (FORJ) can allow coupling of light from a non-rotating fibre to one that is rotating. In one embodiment, this is achieved by directing light out of the fibre through lenses to straighten the light and bounce it from mirrors (over an air gap) and coupling it back into an opposing, e.g. rotating, fibre In one embodiment, e.g. according to FIGS. 1A and 1B, the strain sensitive element 3 is connected to the light source 5 and/or light detector 6 via a fibre optic rotary joint 7 configured to optically connect a rotating part of the optical fibre 2 with a stationary part of the optical fibre 2. In one embodiment light can be coupled onto the fibres on the shaft via FORJ, wherein the interrogator is located at a remote location (e.g. control room) from where the fibre optic sensing locations are constantly or periodically monitored, as well as other sensors that may be in the platform/vessel/vehicle (e.g. fibre optic pressure gauges, accelerometers etcetera). In the embodiment of FIG. 1A, the fibre optic rotary joint 7 comprises an off-axis fibre optic slip ring. For example, an off-axis fibre optic slip ring according to U.S. Pat. No. 7,792,400 B1 may be used. In the second embodiment of FIG. 1B, an on-axis fibre optic rotary joint (FORJ) is used. The on-axis joint 7 can be simpler in structure but it can be difficult to bring the optical fibre 2 to a central axis of rotation. For example, it may have to pass the engine 21 for example by drilling in the shaft 1.

Figure 2A:
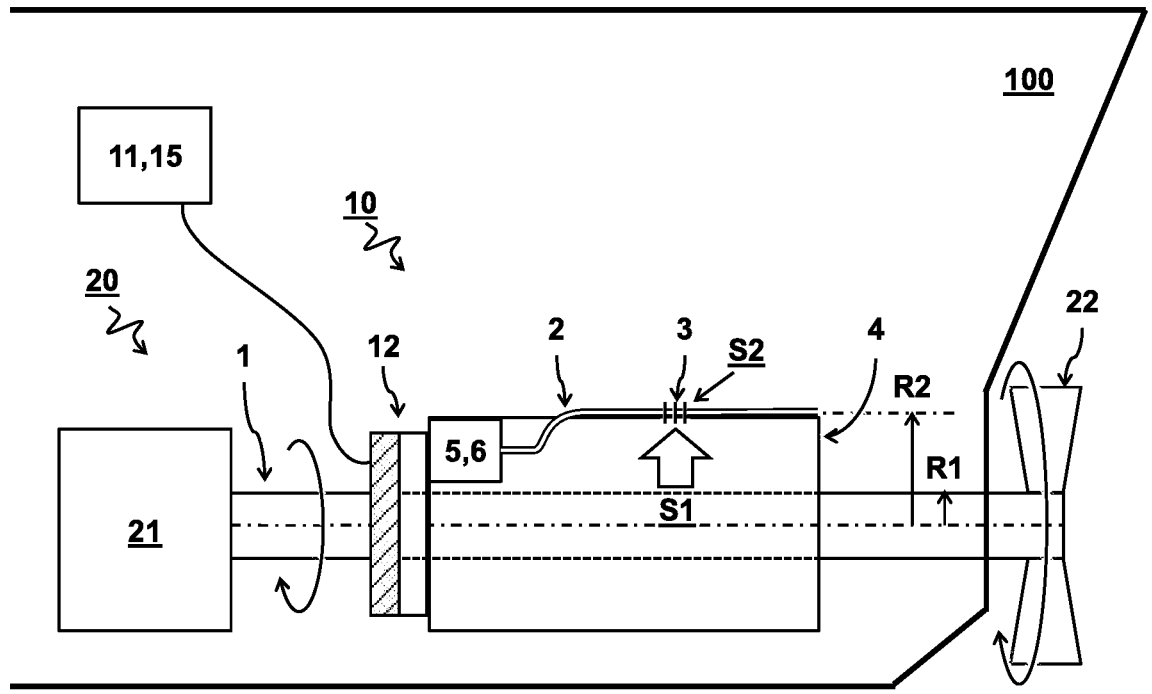
FIG. 2A schematically illustrates a third embodiment of a sensor system wherein the system is comprised in a rotating structure attached to the drive shaft and electrical signals are coupled between a power source the system via an electrical slip ring.

FIG. 2A schematically illustrates a third embodiment of a sensor system 10 wherein the system is comprised in a rotating structure, in this case the housing of the connection structure 4 attached to the drive shaft 1. In the embodiment, the system comprise an electrical slip ring 12 for passing electrical signals between a stationary frame and a rotating frame of the light source 5 and/or light detector 6. The slip rings can have many form factors, including ones with boreholes so that rotary components pass through them. The electrical signals may include power to the light source 5 and/or light detector 6 from the power source 11. Alternatively, or in addition, the electrical signals may include control and/or sensor signals, from and to the controller 15.

Figure 2B:
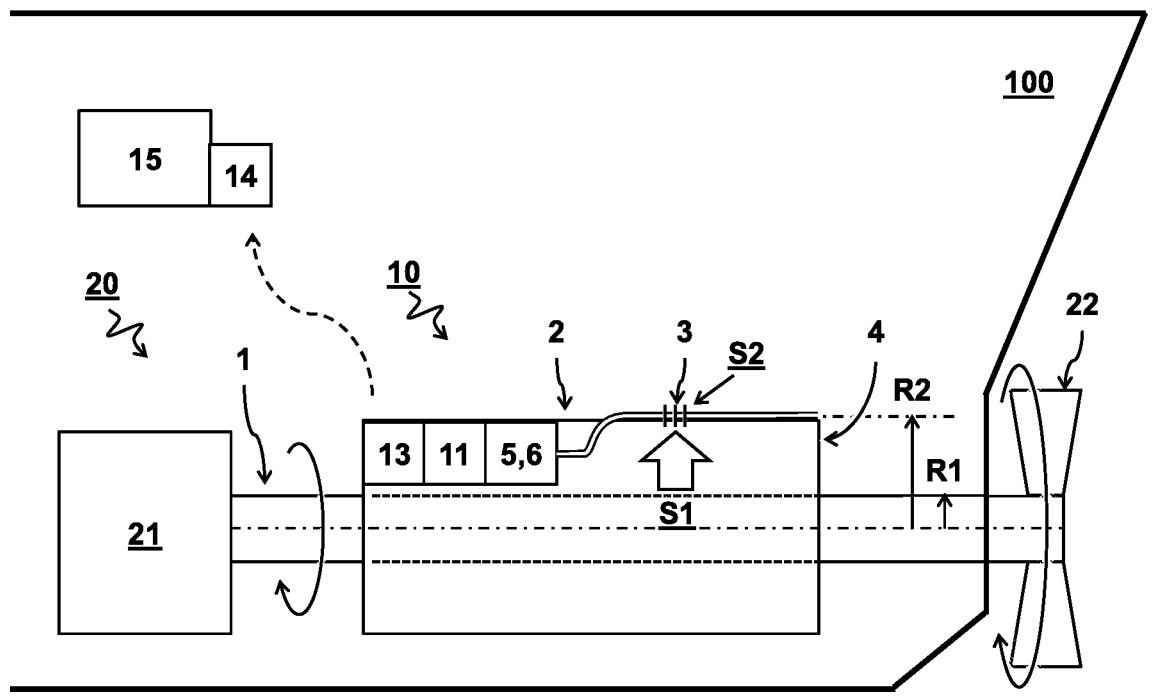
FIG. 2B schematically illustrates a fourth embodiment of a sensor system, wherein also the power source is integrated in the rotating structure and signals are wirelessly transmitted.

FIG. 2B schematically illustrates a fourth embodiment of a sensor system, wherein also the power source is integrated in the rotating structure 4 and signals are wirelessly transmitted. In the embodiment, the connection structure 4 comprises an electrical power source 11 for powering the light source 5 and/or light detector 6. In one embodiment, the connection structure 4 comprises a wireless transceiver 13 configured to wirelessly transmit and/or receive data between the rotating connection structure 4 and a stationary transceiver 14, e.g. coupled to the controller 15.

In another or further embodiment, there is provided a wirelessly powered or self powered (e.g. by heat, light, vibration) interrogation unit wherein a power source is not needed. In another or further embodiment, the unit may comprise at least a small power storage unit to even out power such as a capacitor or battery.

According to one aspect, the present disclosure provides a method for monitoring a powertrain 20 having a drive shaft 1. In one embodiment, the method comprises providing the sensor system 10 as described herein. For example, one or more optical fibres 2 of the sensor system 10 are connected to the drive shaft 1. An input light signal Li can be emitted to one or more optical fibres 2 for optical interaction with one or more strain sensitive elements 3. An output light signal Lo from the optical fibre 2 resulting from the optical interaction of the input light signal Li with the one or more strain sensitive elements 3 can be measured for determining the respective strain S2 on the one or more strain sensitive elements 3. Based on the measured respective strain S2, one or more of a torque on the drive shaft 1, bending of strain S1 on the drive shaft 1, or thrust strain S1 on the drive shaft 1 can be calculated.

In one embodiment, the method comprises adjusting operation of an engine 21 driving the powertrain 20 based on the calculated torque, bending, and/or thrust. Furthermore, the bending on the shaft can be corrected by re-alignment of the shaft to the drive system.

In one embodiment, e.g. as will be discussed in further detail below with reference to FIGS. 5A to 6B, at least three strain sensitive elements 3a,3b,3c are arranged along at least three respective lengths 2a,2b,2c of the one or more optical fibres 2a,2b,2c. In a further embodiment, the respective lengths 2a,2b,2c of the one or more optical fibres follow parallel paths with respect to each other wherein the parallel paths extend at least in a direction along a length of the drive shaft 1. In one embodiment, the method comprises distinguishing between a torque induced deformation of the drive shaft 1 and a bending deformation of the drive shaft 1 by comparing respective signs of wavelength shifts in the optical properties of the at least three strain sensitive elements 3a,3b,3c.

Figure 3A:
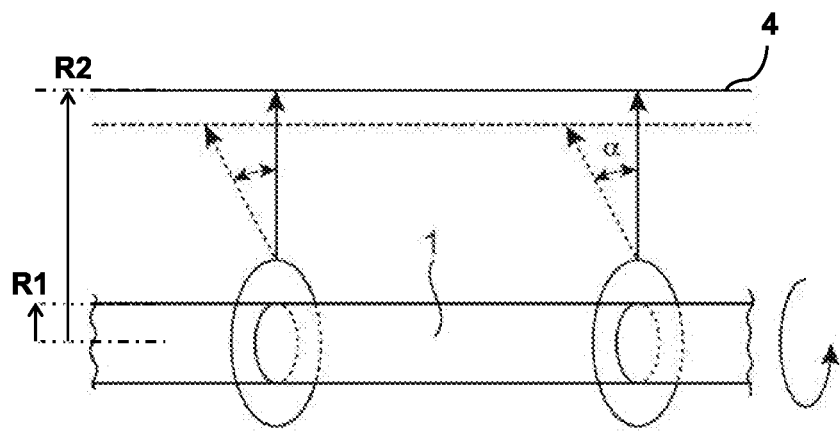
FIG. 3A schematically illustrates the effect of torque on the drive shaft and connection structure.

FIG. 3A schematically illustrates the effect of torque on the drive shaft 1 and connection structure 4. In one embodiment, the connection structure 4 as described herein is configured to amplify torque induced deformation "α" of the drive shaft 1.

Figure 3B:
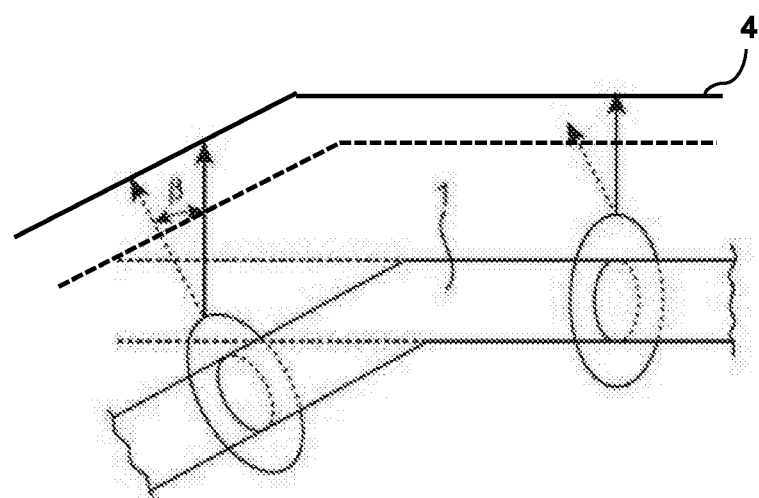
FIG. 3B schematically illustrates the effect of bending on the drive shaft and connection structure.

FIG. 3B schematically illustrates the effect of bending on the drive shaft and connection structure. In one embodiment, the connection structure 4 as described herein is configured to amplify bending deformation β of the drive shaft 1.

Figure 3C:
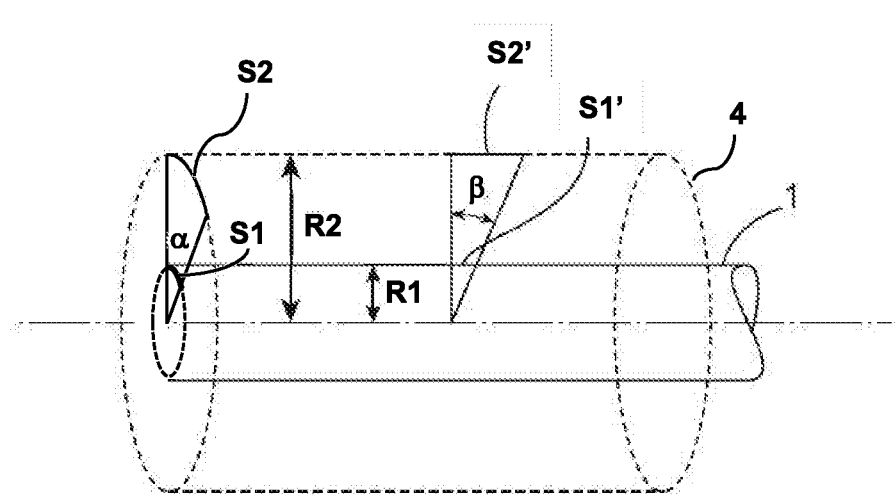
FIG. 3C schematically illustrates enhancement of torque and bending strain in the connection structure compared to the drive shaft.

FIG. 3C schematically illustrates enhancement of both torque and bending strain S2,S2' in the connection structure 4 compared to the respective strain S1,S2' in the drive shaft 1.

Figure 4A:
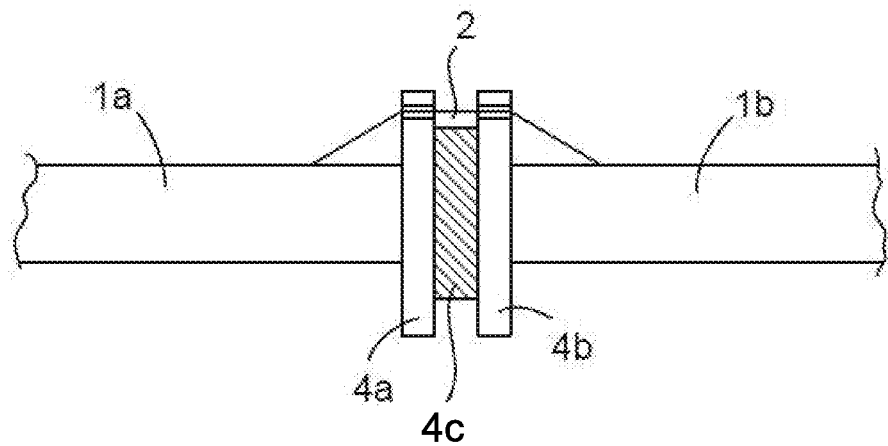
FIG. 4A schematically illustrates an embodiment of a connection structure.

In use, as the shaft 1 rotates the shaft is subjected to angular displacement of the shaft, as shown 3 by the angle α, and longitudinal displacement of the shaft 1 as shown by angle β. It is desirable to measure these and other deformations to perform an effective monitoring of a drivetrain, in particular; angular displacement (angle α) lateral displacement (or bending) (angle β) and longitudinal deformation (not shown). In most cases, it is highly desirable to distinguish these deformations as their causes may also be different; torque, misalignment and thrust, respectively FIG. 4A schematically illustrates an embodiment of a connection structure 4. In one embodiment, the connection structure 4 comprises at least two rigid rings 4a,4b configured to hold a length of the optical fibre with the strain sensitive element 3 there between. In another or further embodiment, the connection structure 4 comprises a clamping ring 4a,4b configured to clamp around an outer surface of the drive shaft 1. This can also be used e.g. in a cylinder shaped connection structure 4. In one embodiment, wherein the connection structure 4 comprises first and second parts 4a,4b for connecting to the drive shaft 1 and a third part 4c between the first and second part 4a,4b, wherein a rigidity of the third part 4c is lower than respective rigidities of the first and second parts 4a,4b.

In one embodiment, at least one optical fibre, 2, positioned substantially parallel to the drive shaft 1. An example of the propulsion shaft in use is a rotating shaft 1 used in a boat or ship that is rotated by an applied force (not shown) and the rotational force of the shaft 1 is used to drive a propeller. The at least one optical fibre 2 is positioned in communication with the propulsion shaft and configured to measure radial displacement (torque), bending (misalignment) and longitudinal displacement (thrust) of the propulsion shaft in use. An optical interrogator, e.g. as discussed herein, can be used to interrogate the optical fibre 2

In one embodiment, the fibres 2 are provided onto rigid rings 4a, 4b attached to the shaft 1 by joining means such as, e.g., soldering, screwing, clamping, etc. The attached rings 4a, 4b may provide the technical benefit of amplifying bending and angular deformation on the shaft 1. For example, with reference to FIG. 3C, in a situation of an angular deformation of a shaft of radius R1, the angle generates a first displacement S1 on the surface of the shaft 1, whereas a second displacement S2 is obtained on the outer surface of a ring attachment with radius R2 wherein the second displacement is larger than the first displacement. The optical fibre 2a, 2b, 2c can measure the strain caused by such twisting on the propulsion shaft more accurately when attached at the ring. Similarly, a bending of the beam with an angle β also can also generate an amplified effect of displacement.

In one embodiment, the connection structure is made in such a way to temporarily deploy during operation by clamping them to existing shafts such that operations can be monitored for limited time and can be moved to monitor different locations or systems at different times. For example, the connection structure allows for permanent or temporary installations on existing shafts in existing propulsion systems, with minimal interference in the setup. In a further technical advantage, the connection structure can be covered in a protective cylinder or sleeve like housing to allow for the protection of the fibres during operation, thereby extending their lifetime.

In one embodiment, the connection structure, e.g. rings 4a,4b comprise a high rigidity composites that allow for thin, light but highly rigid attachments to be made. In one embodiment, the connection structure 4 between the drive shaft 1 and the optical fibre 2 comprising the strain sensitive element 3, comprises or essentially consists of a material having relatively low thermal conductivity, e.g. lower than 10 W m$^{-1}$ K$^{-1}$, lower than 5 W m$^{-1}$ K$^{-1}$, or even lower than 1 W m$^{-1}$ K$^{-1}$. By having a low thermal conductivity, it can be alleviated that thermal fluctuation, e.g. heating, of the drive shaft influences the measurement of the strain sensitive element. In one specific example, the attachment components can be made of PEAK with carbon fibre fillings to increase rigidity. In a further technical advantage, use of non-metal high rigidity attachments, the temperature effects of the shaft are transferred minimally to the fibre connection points, to overcome the limitations of sensors that would be attached directly on the shafts. Furthermore, the rings can be replaced by a solid cylinder made of PEAK or carbon fibre wherein the fibres 2a, 2b, 2c are embedded.

In one embodiment, at least one optic fibre 2 is positioned at two sections of the propulsion shaft 1a and 1b coupled together at a connection point. The at least one fibre 2 is attached to the shaft using at least one mounting ring or in between at least one pair of coupling flanges 4a, 4b. It will be appreciated that most implementations of a propulsion shaft consist of at least two parts, connected by mounting flanges. For example, a suitable place to implement a measuring system based on optical fibres is in between the coupling flanges 4a and 4b, either by directly connecting the fibres to the flanges or by feeding them through openings and connect them to the main shaft bodies. A interconnection plate or structure 4c (shown as the shaded area) could be rigid or elastic; the fibre 2 can be positioned inside or outside of the connection plate 4c. It will be appreciated that the at least one fibre 2 can be mounted between coupling flanges 4a and 4b of the drive shaft.

Figure 4B:
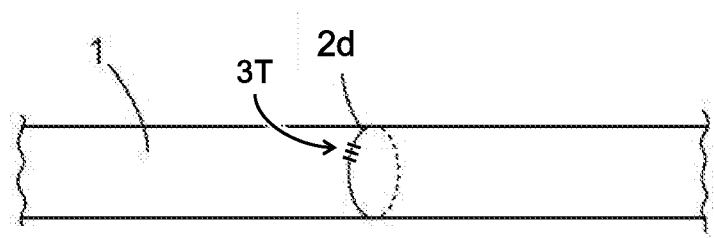
FIG. 4B schematically illustrates an embodiment of a temperature sensor.

FIG. 4B schematically illustrates an embodiment of a temperature sensor 3T. For example, the system comprises a temperature sensor configured to compensate for temperature offset and/or drift in the system. In one embodiment, an optical temperature sensor 3T is comprised along a length 2d of one or more optical fibres. In one embodiment, the length 2d of the one or more optical fibres comprising the optical temperature sensor 3T is arranged in a loop configuration around the drive shaft 1. In one embodiment, the at least one optical fibre or fibre section 2d may be configured in an unstressed configuration to compensate for temperature offset and/or drift. In one embodiment, the loop is formed in at least one of the rings 4a,4b attached to the shaft as described in FIG. 4A.

In one embodiment, the optical temperature sensor 3T is comprised in a length 2d of the one or more optical fibres tightly wound along a structure circumference around the drive shaft 1, wherein a temperature change causes expansion or contraction of the circumference of the structure 1 leading to a shift of wavelength that is reflected and/or transmitted by the optical temperature sensor 3d. Alternatively, or in addition, the temperature sensor 3T can be wound tightly around an expansive connection structure (not shown here) at a distance from the shaft.

Figure 5A:
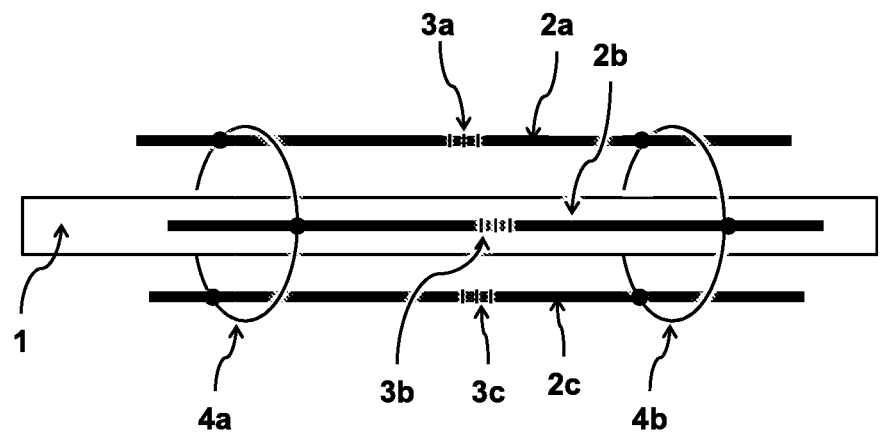
FIG. 5A schematically illustrates a first embodiment of parallel optical fibres, wherein the fibres are attached to the drive shaft via a connection structure, wherein the fibres follow straight paths.

FIG. 5A schematically illustrates an embodiment of parallel optical fibres 2a,2b,2c, wherein the fibres are attached to the drive shaft 1 via a connection structure 4a and 4b. In the embodiment, the fibres follow straight paths parallel to the length of the shaft. In one embodiment, the sensor system comprises at least three strain sensitive elements 3a,3b,3c arranged along at least three respective lengths 2a,2b,2c of one or more optical fibres 2a,2b,2c. In one embodiment, the connection structure 4 is configured to hold the respective lengths 2a,2b,2c along parallel paths with respect to each other. In one embodiment, the parallel paths extend at least in a direction along a length of the drive shaft 1.

According to one aspect, a sensor system for monitoring a powertrain having a drive shaft 1 comprises one or more optical fibres comprising at least three strain sensitive elements 3a,3b,3c arranged along at least three respective lengths 2a,2b,2c of the one or more optical fibres wherein each strain sensitive element is configured to change at least one of its optical properties as a function of strain S2a, S2b on the respective length 2a, 2b of the optical fibre comprising the strain sensitive element. The respective lengths 2a,2b,2c of the one or more optical fibres are connected to the drive shaft 1 wherein the connection is configured to pass a strain S1 on the drive shaft 1 to cause as a respective strain S2a,S2b,S2c on the strain sensitive elements 3a,3b,3c.

In one embodiment, one or more light sources (not shown here) may be connected to the one or more optical fibres and configured to emit input light signals to the one or more optical fibres for optical interaction with the strain sensitive elements 3a,3b (third element 3c not visible). In one embodiment, one or more light detectors (not shown here) are configured to receive output light signals from the one or more optical fibres 2a,2b resulting from the optical interaction of the input light signals with the strain sensitive elements 3a,3b for measuring the respective strain S2a,S2b on the strain sensitive elements 3a,3b. In one embodiment, the respective lengths 2a,2b,2c of the one or more optical fibres follow parallel paths with respect to each other wherein the parallel paths extend at least in a direction along a length of the drive shaft 1.

In one embodiment, the respective lengths 2a,2b,2c are part of a single optical fibre. In another embodiment, the respective lengths 2a,2b,2c are part of separate optical fibres. In one embodiment (not shown), one respective length 2a of an optical fibre comprises multiple strain sensitive elements.

In one embodiment, three optical fibres 2a, 2b, 2c are mounted remote to the propulsion shaft 1. The three optical fibres 2a, 2b, 2c are arranged offset from each other along a longitudinal axis of the device and configured with directional sensitivity such that the fibres 2a, 2b, 2c are adapted to distinguish linear/radial displacement from a bend of the shaft 1. In a preferred embodiment, the three optical fibres 2a, 2b, 2c shown are offset at an angle of approximately 120 degrees from each other. The directional sensitivity of this embodiment can be accomplished by determining the magnitude of the strain for each of the fibres 2a, 2b, 2c. In case of a deformation (bending) of the shaft, at least one of the fibres will have a different sign of strain from the other two, e.g., on at least one of the fibres there will be a negative strain while the others may still have a positive strain. In case of a linear or radial displacement all the fibres will have positive strains.

Figure 5B:
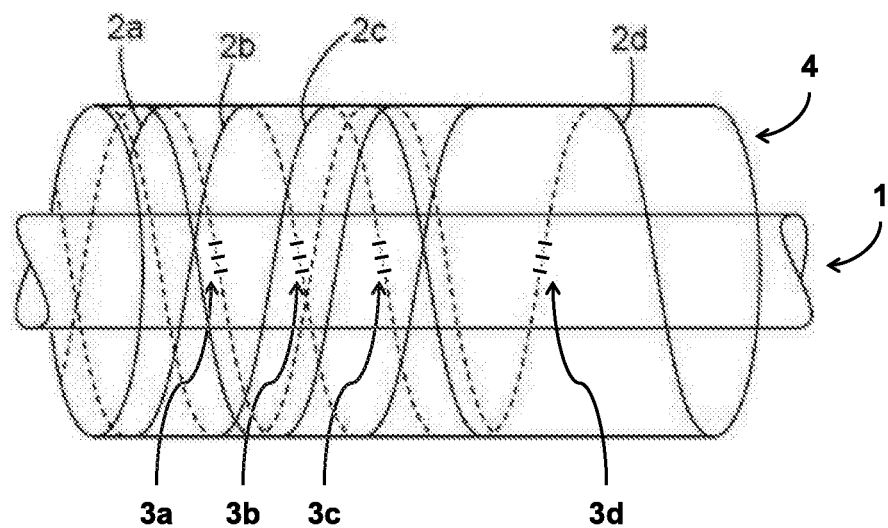
FIG. 5B schematically illustrates a second embodiment of parallel optical fibres, wherein the fibres are attached to the drive shaft via a connection structure, wherein the fibres follow helical paths.

FIG. 5B schematically illustrates another embodiment of parallel optical fibres 2a,2b,2c, wherein the fibres are attached to the drive shaft via a connection structure 4.

In one embodiment, the respective lengths 2a,2b,2c of the one or more optical fibres comprising the strain sensitive elements 3a,3b,3c follow parallel helical paths extending around the drive shaft 1. This can provide several technical advantages in allowed bending of the shaft under monitoring before fibre failure and assembly or increased sensitivity. In a preferred embodiment, the at least three fibres are arranged over the shaft (directly over or at a fixed distance by means of rings, cylinders, etc. attached to the shaft) defining three helixes parallel to each other, for example in clockwise rotation when viewed from one end of the shaft, and with a constant separation. In such a situation, each of the parallel running fibres in the helix fibres would be differently sensitive to the bending of the shaft while remaining equally sensitive to the torsion creating angle a (due torque) on the shaft. This configuration allows for distinguishing of the deformations on the shaft due to torque and misaligned loads.

In one embodiment, the system comprises a first length 2a of an optical fibre comprising a first strain sensitive element 3a, and a second length 2d of the same or another optical fibre comprising a second strain sensitive element 3d, wherein the first and second lengths 2a and 2d follow opposite helical paths around the drive shaft 1. In one embodiment, the opposite helical path has the same inclination angle with respect to the drive shaft as the first one or more helical paths, but with an opposite sign. Providing at least one helical path in an opposite direction may yield additional information to distinguish e.g. torsion and thrust (shaft axial length change). In one embodiment, the system comprises two, three, or more lengths of optical fibre with sensors along parallel helical paths in one direction (e.g. 3a,3b,3c), and a further length (e.g. 3d) of optical fibre with sensor in an opposite helical path.

For example, a fourth fibre is included that is arranged defining a fourth helix in a direction opposite to the direction of the three previous helixes (i.e., in the counter-clockwise direction when viewed from the same direction as the previous three fibres), such that the length change between the first three fibres and the said fourth fibre is equal to twice the torsion in the shaft over the length of measurement whereas the length difference between the fibres running parallel would be zero. Alternatively, this fourth fibre can also be located longitudinally with respect to the shaft obtaining similar results. In one embodiment, the respective lengths 2a,2b,2c of the one or more optical fibres are connected to the drive shaft 1 by a connection structure 4 configured to hold the respective lengths 2a,2b,2c at a radial distance remote from the drive shaft 1 for amplifying the strain S2 on the respective lengths 2a,2b,2c of the one or more optical fibres comprising the strain sensitive elements 3a,3b,3c with respect to the strain S1 on the drive shaft 1. Alternatively, as illustrated in FIGS. 6A and 6B, the respective lengths 2a,2b,2c of the one or more optical fibres can also be directly attached to the drive shaft 1.

With the fibres attached as described herein, it is possible to distinguish the longitudinal deformation as all of the aforementioned at least four fibres would respond equally to length change over the section being measured. In a further embodiment, all of the fibres can be on one fibre, each with optical characteristics that are spectrally shifted such that sections of measurements can be performed at the same time using interrogation scheme. In one embodiment the interrogation unit is remotely located such that it is located remotely, away from the harsh conditions at the location of measurement to allow for more stable measurements. In yet another embodiment, the interrogation unit is a wavelength-swept laser system such that reflections from precisely tuned emissions from the interrogator, inside a desired range of wavelengths, are collected at a detector to allow for parallel measurement of many sections of the fibres to obtain real-time information on torque, thrust and misalignments at the same time. Furthermore, the temperature information can also be recorded at the same time.

Figure 6A:
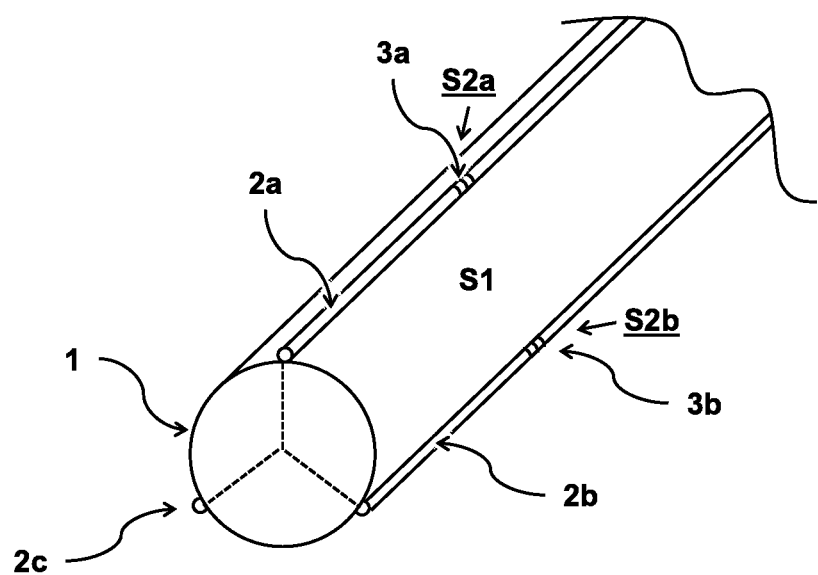
FIG. 6A schematically illustrates a third embodiment of parallel optical fibres, wherein the fibres are attached directly to the drive shaft and wherein the fibres follow straight paths.

FIG. 6A schematically illustrates another embodiment of parallel optical fibres 2a,2b,2c, wherein the fibres are attached directly to the drive shaft 1 and wherein the fibres follow straight paths. In one embodiment, the respective lengths 2a,2b,2c of the one or more optical fibres are equidistant with respect to each other along a circumference around the drive shaft 1. In one embodiment, the respective lengths 2a,2b,2c of the one or more optical fibres are equidistantly distributed along a circumference around the drive shaft 1, e.g. illustrated by the dashed lines at 120 degrees interval along the circumference.

Figure 6B:
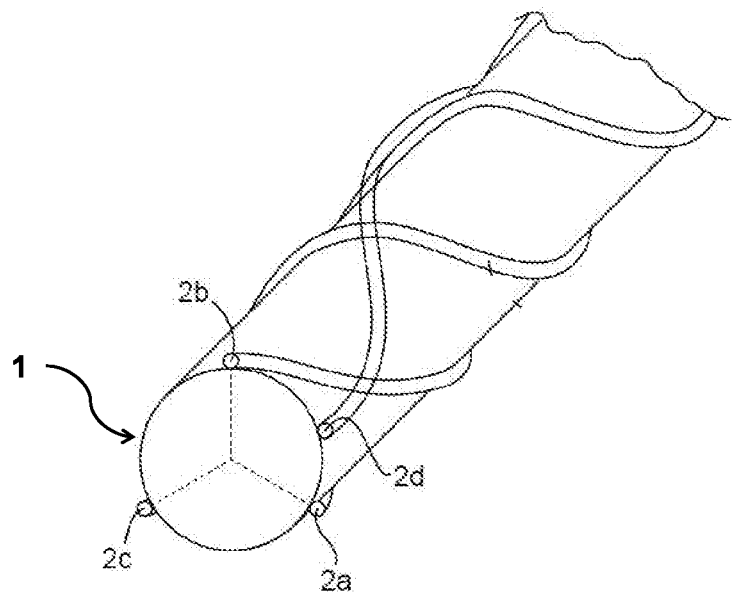
FIG. 6B schematically illustrates a fourth embodiment of parallel optical fibres, wherein the fibres are attached directly to the drive shaft and wherein the fibres follow helical paths

FIG. 6B schematically illustrates another embodiment of parallel optical fibres 2a,2b,2c, wherein the fibres are attached directly to the drive shaft and wherein the fibres follow helical paths. The embodiment also shows a fourth fiber 2d having an opposing helical path and e.g. comprising a temperature sensor as discussed with reference to FIG. 5B.

Figure 7A:
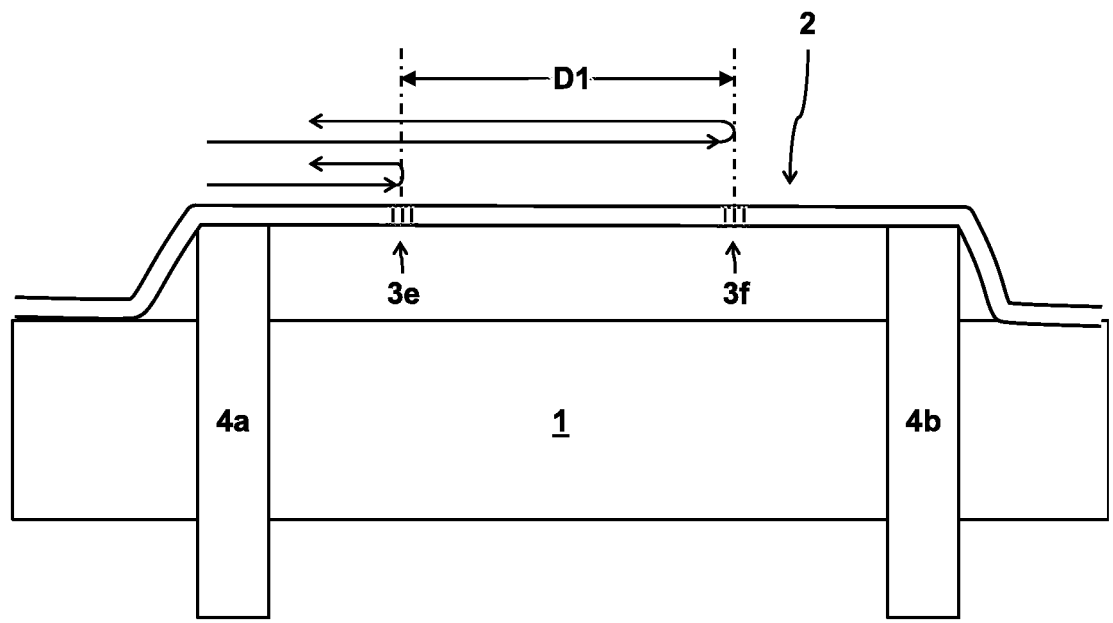
FIGS. 7A and 7B illustrate an embodiment of a fibre with multiple FBGs for interferometric measurement.
Figure 7B:
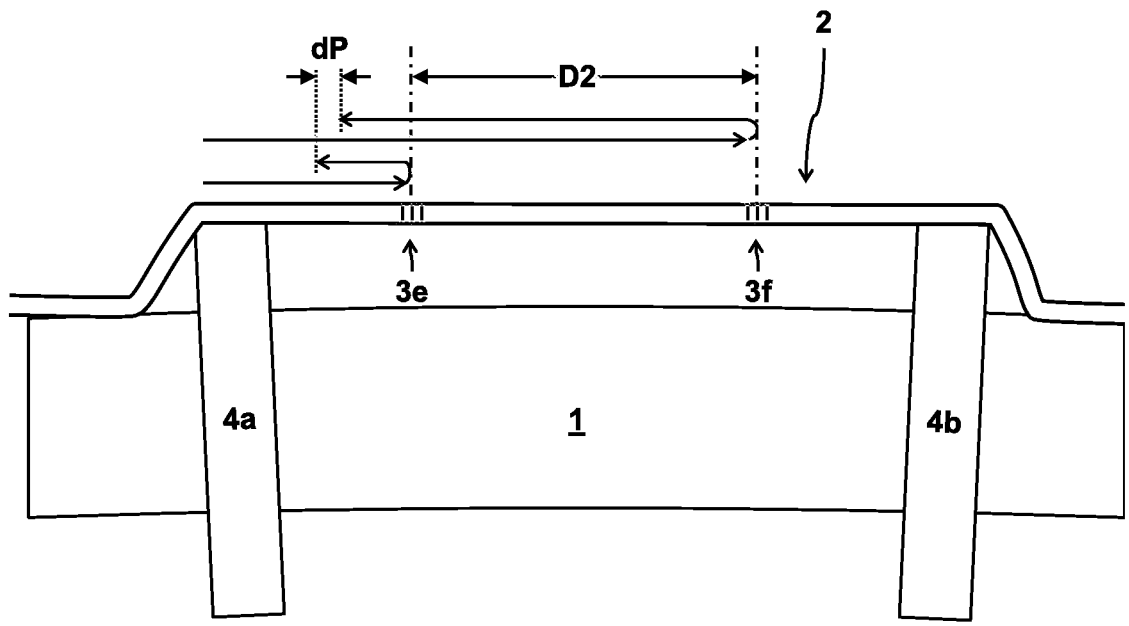

It is recognized that in certain applications, the deformations of the shaft will be of small magnitude and over a relatively long length of the system. In such situations, local strains can be of tiny magnitudes even in view of the technical improvements described above in measurements. In such situations, local strain detection using FBGs can remain limited. For such situations, a further technical improvement is illustrated by the system of FIGS. 7A and 7B wherein opposing rings (flanges 4a,4b) of the measurement setup are separated further apart and on each fibre 2 used there is integrated at least a pair of FBGs 3e and 3f or other reflecting element with sufficiently broadband spectral reflectivity that is selected to be overlapping in wavelength band such that a fibre optic Fabry-Perot cavity is formed. By using a Fabry-Perot cavity, which is an interferometric measurement approach which measures length change not local strain, an amplification of the signal is achieved by the length separation of the opposing FBG mirrors.

For example, FIG. 7A illustrates that respective reflections from FBGs 3e and 4f in the fibre 2 experience a certain path length difference caused by the distance "D1" there between. When the drive shaft 1 is subjected to strain, e.g. bending as illustrated in FIG. 7B, this results in strain on the fibre, which can be amplified by the connection structure formed by flanges 4a and 4b. In addition to any changes in the reflection characteristic of the FBGs, also a distance "D2" between the FBGs 3e and 3f can be affected. Accordingly, the light traveling the fibre 2 may experience a path length difference dP as a result of the bending of the shaft 1 between the situations of FIG. 7A versus FIG. 7B. For example, for one reflection, the path length difference dP is twice the difference in distance D2-D1 (light travels once back and forth). Light may also travel multiple times between the FBGs, for which the effect can be further enhanced. Accordingly, small path length differences can be measured by interferometric measurement between light reflected from the first FBG 3e and the second FBG 3f.

In one embodiment, the sensor system comprises an interferometer (not shown here) configured to receive two or more output light signals from the optical fibre 2 resulting from the optical interaction of the input light signal with two or more partially reflective (e.g. FBG) elements 3e,3f for interferometrically combining two or more output light signals from the elements 3e,3f for measuring the strain by the interferometric measurement. For example, the interferometer can be comprised or otherwise coupled to a light detector as described herein. In yet a further embodiment, the measurement section of the fibre 2, e.g. between the flanges, can be further split into several measurement sections by use of wavelength multiplexing with a Fabry-Perot configuration. In such an embodiment, fibres containing several FBGs, each with a pair of FBGs configured to overlap in reflection wavelengths but not overlap with the other pairs in the fibre can be configured with each pair having a separation in the fibre based on application needs. In one embodiment, using a Fabry Perot configuration, it can be preferred to have two or more FBGs in sections not being strained to avoid that the FBGs shift in wavelength in addition to their relative displacement. For example, FBGs for use in a Fabry Perot configuration can be positioned on the non-strained portion of the rings 4a and 4b.

The present embodiment synergistically combines the effects of increased sensitivity to strain by the connection structure 4a,4b and the interferometric measurement of multiple reflecting elements in the fibre. Of course other embodiments, also other connection structures can be used, e.g. as described herein, or the connection structure can be omitted, e.g. connecting a fibre with multiple strain sensitive elements directly on the shaft. In one embodiment, a strain sensitive element (e.g. FBG) is arranged in a section of an optical fibre having a locally reduced diameter at the position of the element. For example, the locally reduced diameter may facilitate focussing the strain to the region around the FBG to even further increase sensitivity.

The sensor system as described herein can be used to employ a strain sensitive element that is capable of making sensitive measurements over a wide dynamic operational range. Various systems and methods can be used to transfer the optical signal from the shaft to a computer system for processing, such as an optical slip ring, electrical slip ring using an electro-optical interrogator, wireless transfer or by mounting the optical interrogator system on a rotating platform on the shaft. For the purpose of clarity and a concise description, features are described herein as part of the same or separate embodiments, however, it will be appreciated that the disclosure may include embodiments having combinations of all or some of the features described. For example, features described with reference to an embodiment including a connection structure can also be applied to embodiments without the connection structure, e.g. wherein fibres are attached directly to the drive shaft, and vice versa. The various elements of the embodiments as discussed and shown offer certain advantages, such as improved sensitivity to strain induced deformation and distinguishing different types of strain. Of course, it is to be appreciated that any one of the above embodiments or processes may be combined with one or more other embodiments or processes to provide even further improvements in finding and matching designs and advantages. It is appreciated that this disclosure offers particular advantages to monitoring of a propulsion system, and in general can be applied for any system comprising a drive shaft.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A sensor system for monitoring a powertrain, the sensor system comprising:
    an optical fibre comprising a strain sensitive element configured to change its optical properties based on a strain on the strain sensitive element;
    a connection structure configured to hold a length of the optical fibre with the strain sensitive element at a radial distance remote from a drive shaft of the powertrain, wherein the connection structure is configured to connect the optical fibre to the drive shaft wherein a strain on the drive shaft is passed by the connection structure to the optical fibre for causing the strain on the strain sensitive element to be amplified with respect to the strain on the drive shaft by the radial distance, wherein the optical fibre comprising the strain sensitive element is held pre-stressed at the radial distance by the connection structure in absence of strain on the drive shaft;
    a light source connected to the optical fibre and configured to emit an input light signal to the optical fibre for optical interaction with the strain sensitive element; and
    a light detector configured to receive an output light signal from the optical fibre resulting from the optical interaction of the input light signal with the strain sensitive element for measuring the strain on the strain sensitive element to monitor the powertrain.

2. The sensor system according to claim 1, wherein the drive shaft has a shaft radius and the strain sensitive element is held by the connection structure at a distant radius from a centre of the drive shaft, wherein the distant radius is at least a factor one-and-a-half times the shaft radius.

3. The sensor system according to claim 1, wherein the connection structure comprises at least two rigid rings of high rigidity composite configured to clamp around an outer surface of the drive shaft.

4. The sensor system according to claim 1, wherein the connection structure comprises at least two rigid rings disposed at an axial distance from each other configured to hold the length of the optical fibre with the strain sensitive element there between, wherein the strain on the drive shaft is passed by the rigid rings of the connection structure to the optical fibre held there between for causing the strain on the strain sensitive element to be amplified with respect to the strain on the drive shaft by the radial distance, wherein the optical fibre comprising the strain sensitive element is held pre-stressed between the rigid rings at the radial distance in absence of strain on the drive shaft.

5. The sensor system according to claim 4, wherein the connection structure comprises a cylindrical intermediate part disposed along an axis of the drive shaft between the at least two rigid rings, wherein a rigidity of the intermediate part is lower than respective rigidities of the rigid rings.

6. The sensor system according to claim 1, comprising at least three strain sensitive elements arranged along at least three respective lengths of the optical fibre at the radial distance remote from the driving shaft, wherein the connection structure is configured to hold the at least three respective lengths along parallel paths with respect to each other, wherein the parallel paths extend at least in a direction along a length of the drive shaft.

7. The sensor system according to claim 1, wherein the system comprises a fibre optic rotary joint with an off-axis fibre optic slip ring.

8. The sensor system according to claim 1, wherein at least one of the light source and the light detector is comprised in the connection structure rotating with the drive shaft.

9. The sensor system according to claim 1, comprising a memory for recording the strain measured on the strain sensitive elements according to time; and a processor configured to calculate vibrational components in the drive shaft based on the measured strain.

10. The sensor system according to claim 1, comprising an interferometer configured to receive two or more output light signals from the optical fibre resulting from the optical interaction of the input light signal with two or more partially reflective elements for interferometrically combining two or more output light signals from the two or more partially reflective elements for measuring the strain.

11. The sensor system according to claim 1, wherein the strain sensitive element is formed by a Fiber Bragg Gratings.

12. The sensor system according to claim 1, wherein the powertrain is of a boat or ship.

13. A sensor system for monitoring a powertrain, the sensor system comprising:
one or more optical fibres comprising at least three strain sensitive elements arranged along at least three respective lengths of the one or more optical fibres, wherein the respective lengths of the one or more optical fibres follow parallel paths around a drive shaft of the powertrain, wherein the parallel paths are equidistant with respect to each other along a circumference of the drive shaft, wherein each strain sensitive element is configured to change at least one of its optical properties based on a strain on the respective length of the optical fibre comprising the strain sensitive element;
wherein the respective lengths of the one or more optical fibres are connected to a drive shaft wherein the connection is configured to pass a strain on the drive shaft to cause as a respective strain on the strain sensitive elements;
one or more light sources connected to the one or more optical fibres and configured to emit input light signals to the one or more optical fibres for optical interaction with the strain sensitive elements; and
one or more light detectors configured to receive output light signals from the one or more optical fibres resulting from the optical interaction of the input light signals with the strain sensitive elements for measuring the respective strain on the strain sensitive elements to monitor the powertrain by comparing respective signs of wavelength shifts in the optical properties of the at least three strain sensitive elements for distinguishing at least between a torque induced deformation of the drive shaft and a bending deformation of the drive shaft.

14. The sensor system according to claim 13, wherein the respective lengths of the one or more optical fibres comprising the strain sensitive elements follow parallel helical paths extending around the drive shaft.

15. The sensor system according to claim 13, further comprising a first length of the one or more optical fibres comprising a first strain sensitive element, and a second length of the one or more optical fibres comprising a second strain sensitive element, wherein the first and second lengths follow opposite helical paths around the drive shaft.

16. The sensor system according to claim 13, wherein an optical temperature sensor is comprised in a length of the one or more optical fibres that is tightly wound around at least one of the drive shaft and connection structure.

17. The sensor system according to claim 13, wherein the respective lengths of the one or more optical fibres are equidistantly distributed along a circumference of the drive shaft.

18. The sensor system according to claim 13, wherein the respective lengths of the one or more optical fibres are connected to the drive shaft by a connection structure configured to hold the respective lengths at a radial distance remote from the drive shaft for amplifying the strain on the respective lengths of the one or more optical fibres comprising the strain sensitive elements with respect to the strain on the drive shaft.

19. The sensor system according to claim 13, wherein each of the at least three strain sensitive elements is formed by a Fiber Bragg Gratings.

20. The sensor system according to claim 13, wherein the powertrain is of a boat or ship.

21. A method for monitoring a powertrain, the method comprising
emitting an input light signal to one or more optical fibres for optical interaction with at least three strain sensitive elements arranged along at least three respective lengths of the one or more optical fibres, wherein the respective lengths of the one or more optical fibres follow parallel paths with respect to each other wherein the parallel paths extend at least in a direction along a length of the drive shaft, wherein the one or more strain sensitive elements are configured to change respective optical properties based on a strain on the one or more strain sensitive element;
measuring an output light signal from the one or more optical fibre resulting from the optical interaction of the input light signal with the at least three strain sensitive elements for measuring the respective strain on the at least three strain sensitive elements; and
based on the measured respective strain, calculating one or more of a torque on a drive shaft, bending of strain on the drive shaft, or thrust strain on the drive shaft, wherein a torque induced deformation of the drive shaft is distinguished from a bending deformation of the drive shaft by comparing respective signs of wavelength shifts in the optical properties of the at least three strain sensitive elements.

22. The method according to claim 21, further comprising:
adjusting operation of an engine driving the powertrain based on at least one of the calculated torque, bending, and/or thrust.

23. The method according to claim 21, wherein a first length of the one or more optical fibres comprises a first strain sensitive element, and a second length of the one or more optical fibres comprises a second strain sensitive element, wherein the first and second lengths follow opposite helical paths around the drive shaft, wherein the method further comprising:
- distinguishing between a torque induced deformation of the drive shaft and a thrust induced deformation of the drive shaft by comparing respective signs of wavelength shifts in the optical properties of the first and second strain sensitive elements.

24. The method according to claim 21, wherein each of the one or more strain sensitive elements is formed by a Fiber Bragg Gratings.

25. The sensor system according to claim 21, wherein the powertrain is of a boat or ship.

* * * * *